US007670223B2

(12) United States Patent
Lind et al.

(10) Patent No.: US 7,670,223 B2
(45) Date of Patent: Mar. 2, 2010

(54) BINGO GAMING SYSTEM WITH PLAYER SELECTED DAUB MODES

(75) Inventors: Clifton E. Lind, Austin, TX (US); Brendan M. O'Connor, Austin, TX (US); Robert F. Lannert, Broken Arrow, OK (US); Jefferson C. Lind, Austin, TX (US)

(73) Assignee: Multimedia Games, Inc., Austin, TX (US)

( * ) Notice: Subject to any disclaimer, the term of this patent is extended or adjusted under 35 U.S.C. 154(b) by 1524 days.

(21) Appl. No.: 10/845,954

(22) Filed: May 14, 2004

(65) Prior Publication Data

US 2004/0214626 A1 Oct. 28, 2004

Related U.S. Application Data

(63) Continuation-in-part of application No. 10/060,643, filed on Jan. 30, 2002, which is a continuation of application No. 10/028,889, filed on Dec. 20, 2001, now Pat. No. 6,802,776.

(60) Provisional application No. 60/265,100, filed on Jan. 30, 2001.

(51) Int. Cl.
*A63F 13/00* (2006.01)

(52) U.S. Cl. .......... 463/19

(58) Field of Classification Search .......... 463/16, 463/19

See application file for complete search history.

(56) References Cited

U.S. PATENT DOCUMENTS

| | | | | |
|---|---|---|---|---|
| 4,856,787 | A * | 8/1989 | Itkis | 273/237 |
| 4,948,138 | A | 8/1990 | Pease et al. | |
| 6,280,325 | B1 * | 8/2001 | Fisk | 463/19 |
| 6,585,590 | B2 | 7/2003 | Malone et al. | |
| 2004/0152499 | A1 | 8/2004 | Lind et al. | |
| 2004/0152510 | A1 | 8/2004 | Herrmann et al. | |

OTHER PUBLICATIONS www.bingomania.net dated May 2000, which was printed from http://web.archive.org/web/19990421101542/http://www.bingomania.net/ on Jan. 14, 2005, pp. 1-14.

(Continued)

*Primary Examiner*—Corbett B Coburn
*Assistant Examiner*—Malina K Rustemeyer
(74) *Attorney, Agent, or Firm*—Russell D. Culbertson; Nathan H. Calvert; J P Cody

(57) ABSTRACT

Players participate in bingo-type games through player stations each having a suitable player interface. The player may manually select between multiple modes in which the player's bingo card representations are daubed. In one daub mode, once a player is assigned a bingo card representation and a game designation set is associated with the bingo card representation, daubing the bingo card representation must be performed manually by the player at the player's respective player station using a suitable interface at the player station. In a card daub mode, one or more of the player's bingo card representations is automatically daubed in response to a card daub input made by the player at the player station using a suitable input device. In a game daub mode, one or more of the player's bingo card representations are daubed without any action by the player other than the player's selection of the game daub mode and the player's submission of a request to enter a bingo game offered by the system.

5 Claims, 8 Drawing Sheets

OTHER PUBLICATIONS

Simross, L. "The Goods: Now the Bingo Parlor Goes Where You Do; [Home Edition]", Jul. 1, 1997. Los Angeles Times & Life & Style Section. pp. 1-2 (printed from http://proquest.umi.com/pqdweb?sid=12752726&sid=2&Fmt=3&clientID=19649&RQT=309&VName=PQD.

Business/Technology Editors "New Software Version of CyberBingo Released", May 10, 1999. Business Wire, pp. 1-3 (printed from http://proquest.umi.com/pqdweb?sid=41242191&sid=2&Fmt=3&clientID=19649&RQT=309&VName=PQD).

url <http://www.bingomania.net> dated May 2000, which was printed from url <http://web.archive.org/web/20402110532 31/www.bingomania.com/faqdetail.asp?page=TipsTricks> on Jul. 2005, pp. 1-7.

urls <http://www.onlinebingo.com/online-bingo.asp> and <http://onlinebingo.com/faqs.asp?q=tips> printed Jul. 29, 2005, pp. 1-7.

urls <http://web.archive.org/web/19990117000016/http://www.fortunet.com> and <http://web.archive.org/web/19990422015740/www.fortunet.com/products.html>, printed Jul. 29, 2005, 3 pgs.

CyberBingo: Where the World Plays Bingo! Why Choose CyberBingo™? What makes CyberBingo™ the Premier Bingo Game on the net?, printed Jan. 30, 2006, 2 pgs. <http://web.archive.org/web/20000310215549/www.cyberbingo.net/about.htm>.

CyberBingo™ News: Game and Player Announcements. "What's New" Archive: 1999, Q1-Jan. 1 to Mar. 31, printed Jan. 30, 2006, 6 pages, <http://web.archive.org/web/19991001224745/http://www.cyberbingo.net/wnew99Q1.htm>.

"EverGreen™ and Tooty Frooty Bingo. Same Game, Two Names." Brochure, 1 page (front and back), Dec. 1998.

Advisory Opinion from the National Indian Gaming Commission, Jul. 10, 1996, 5 pgs.

Advisory Opinion from the National Indian Gaming Commission, Nov. 2, 1999, 3 pgs.

*United States* v. *103 Electronic Gambling Devices*, 223 F.3d 1091 (9th Cir. 2000), 12 pgs.

*United States* v. *162 Megamania Gambling Devices*, 231 F.3d 713 (10th Cir. 2000), 13 pgs.

* cited by examiner

BINGO GAMING SYSTEM WITH PLAYER SELECTED DAUB MODES

CROSS-REFERENCE TO RELATED APPLICATIONS

This application is a continuation-in-part of U.S. patent application Ser. No. 10/060,643, filed Jan. 30, 2002, and entitled "Method, Apparatus, and Program Product for Presenting Results in a Bingo-Type Game," which was a continuation of U.S. patent application Ser. No. 10/028,889, filed Dec. 20, 2001, and entitled "Method and Program Product for Producing and Using Game Play Records in a Bingo-Type Game," now U.S. Pat. No. 6,802,776 B2. The Applicants hereby claim the benefit of each of these non-provisional patent applications under 35 U.S.C. §120. The entire content of each of these non-provisional patent applications is also incorporated herein by this reference.

This application is also related to U.S. provisional patent application No. 60/265,100, filed Jan. 30, 2001, and entitled "Object Draw Gaming System and Program Product." The Applicants hereby claim the benefit of this provisional patent application under 35 U.S.C. §119(e). The entire content of this provisional application is incorporated herein by this reference.

This application is also related to U.S. non-provisional patent application Ser. No. 10/808,914, filed Mar. 25, 2004, and entitled "Automatic Daubing Apparatus and Method for Electronic Bingo Gaming Systems."

TECHNICAL FIELD OF THE INVENTION

This invention relates to gaming and gaming systems. More particularly, the invention relates to a bingo-type gaming system in which players may select from a number of different daub options available at a player station in the system.

BACKGROUND OF THE INVENTION

Bingo-type games are played with predefined bingo cards that each include a number of bingo game designations such as Arabic numerals randomly arranged in a desired manner, commonly in a grid. The bingo game designations on the cards are selected from a pool of available game designations. In more traditional bingo-type games, the cards are physically printed on paper or other suitable material. These printed cards are purchased by players prior to the start of a game. Once all the cards for a game have been purchased, game designations from the available pool of game designations are selected at random. As the game designations are selected and announced in the game, the players match the randomly selected game designations with the designations printed on their respective card or cards. This matching and marking of matched designations on the bingo card is commonly referred to as "daubing" the card. The player first producing a predetermined pattern of matches between the randomly selected game designations and the printed card designations is considered the winner. Consolation prizes may be awarded to players having cards matched to produce consolation prize patterns at the time of the winning pattern.

There are numerous variations on the traditional bingo game. One variation of the traditional bingo game is played with electronic bingo card representations rather than the traditional printed bingo cards. In these bingo-type games, each bingo card is represented by a data structure that defines the various card locations and designations associated with the locations. This bingo-type game is played through player stations connected via a communications network to a central or host computer system. The central computer system is responsible for storing the bingo card representations and distributing or communicating bingo card representations to players at the player stations. The player stations display the bingo cards defined by the card representations and also allow the players to daub or mark designation matches as game designations are announced in the game. A primary advantage of this electronic bingo game is that the games may be played at a much faster pace than is practical with traditional paper bingo. Another advantage of this electronic version of bingo is that the games can be administered and controlled from a remote location and actually played at a number of different bingo establishments.

Traditional bingo games, either played with paper cards or electronic card representations, are limited in the manner in which the results of a game may be displayed. It is also desirable to further increase the speed at which bingo-type games may be played. Yet it is essential that the game retain the basic characteristics of a bingo-type game, namely that the game is played with predefined cards or card representations which the players match or daub against randomly generated game designations, and the game winner is the first player to match the designations in a predetermined winning pattern on his or her card or card representation.

SUMMARY OF THE INVENTION

A method for conducting a bingo-type game according to the present invention includes receiving a daub selection input from a player and responding to the daub selection input by setting a daub mode. This daub mode defines the manner in which a bingo card representation assigned to the player will be daubed in the course of play. A method according to the present invention also includes associating a game play request initiated by the player with a player card representation and with a set of bingo designations to be matched to the player card representation. Once the player card representation and the set of bingo designations have been assigned, methods according to the invention include daubing the player card representation in the manner defined by the daub mode set in response to the daub selection input.

The step of setting the daub mode preferably includes setting the daub mode as either a first-type daub mode or a second-type daub mode. The first-type daub mode requires an independent player input to daub the player card representation. For example, when the first-type daub mode comprises a manual daub mode, the player is required to manually daub each matched card location on the player card representation. Alternatively, when the first-type daub mode comprises a card daub mode the player is required to enter a card daub input which causes each matched card location on the player card representation to be daubed automatically without having to manually daub each different matched location. The second-type daub mode requires no independent player input to daub the player card representation. In this second-type daub mode each matched card location on the player card is daubed without further player input. That is, once the player card is assigned to the player and associated with a designation set for the play of the bingo game, the player need not make any further input to have their card daubed to determine the result of the play in the game.

A gaming system according to the present invention includes a player station having a player station display, a user interface device included with the player station, and a daub selection controller. The user interface device included with the player station enables a player using the player station to enter a daub mode selection input. The daub selection controller sets the daub mode for the player in response to the daub mode selection input. Preferably, the daub selection controller sets the daub mode as either the first-type daub mode requiring an independent player input to daub a player card representation or as the second-type daub mode requiring no independent player input to daub the player card representation.

The daub mode selection input according to the invention may be required each time a player starts play at a particular player station, or even each time a player makes a game play request through a player station. Alternatively, a daub mode selection input may be required only once at a given player station or some other component of the gaming system and this single selection input may be used to set the daub mode for each player station the player uses until the player changes the daub mode by making another daub mode selection.

Preferred forms of gaming systems according to the present invention include numerous player stations all connected to one or more central bingo gaming systems for conducting bingo games through the various player stations. Each player station preferably includes a manual daub interface for enabling the player using the player station to manually daub their assigned player card representations. The player station display preferably includes a touch screen display and the touch screen display is used as the manual daub interface. The user interface device included with the player station for enabling a player to make their dub selection input preferably includes a daub selection control for initiating a signal that results in a control signal to the daub selection controller.

Preferred forms of the invention also include a game daubing component. This game daubing component may be associated with a central part of the gaming system or with each individual player station. In any event, the game daubing component daubs all matched player card locations on the player card representation without independent player input. The game daubing component may be used in matching the respective player card with the respective designation set for each of the daub modes. In the game daub mode, however, the game daubing component may daub the matched card locations exclusively with no further input from the player.

These and other features of the invention will be apparent from the following description of the preferred embodiments, considered along with the accompanying drawings.

DESCRIPTION OF PREFERRED EMBODIMENTS

A player selected daub mode arrangement according to the present invention may be employed in substantially any electronically implemented bingo-type gaming system. This includes bingo-type gaming systems such as that disclosed in U.S. patent application Ser. No. 10/456,721 filed Jun. 6, 2003, and entitled "Method, System, and Program Product for Conducting Multiple Concurrent Bingo-Type Games," in which players are grouped for the play of a standard sequence bingo game. The entire content of this prior application is incorporated by this reference. In addition to standard sequence bingo games, the present invention may also be employed in pre-matched bingo-type games in which all bingo card representations in a set are pre-matched to a set of bingo designations to identify a result for the respective card representations, and then the pre-matched card representations and the associated result are assigned to various players in the game. Such a bingo gaming system is disclosed in each of the two related U.S. non-provisional patent application Ser. Nos. 10/060,643 and 10/028,889 more completely identified above. In the following disclosure, the present invention will be described, for purposes of example, with reference to a pre-matched bingo gaming system such as those described in the related applications. However, it will be appreciated that the present invention is by no means limited to use with such a bingo-type gaming system and may just as readily be implemented in a standard sequence bingo gaming system or some other type of bingo-type gaming system.

Figure 1:
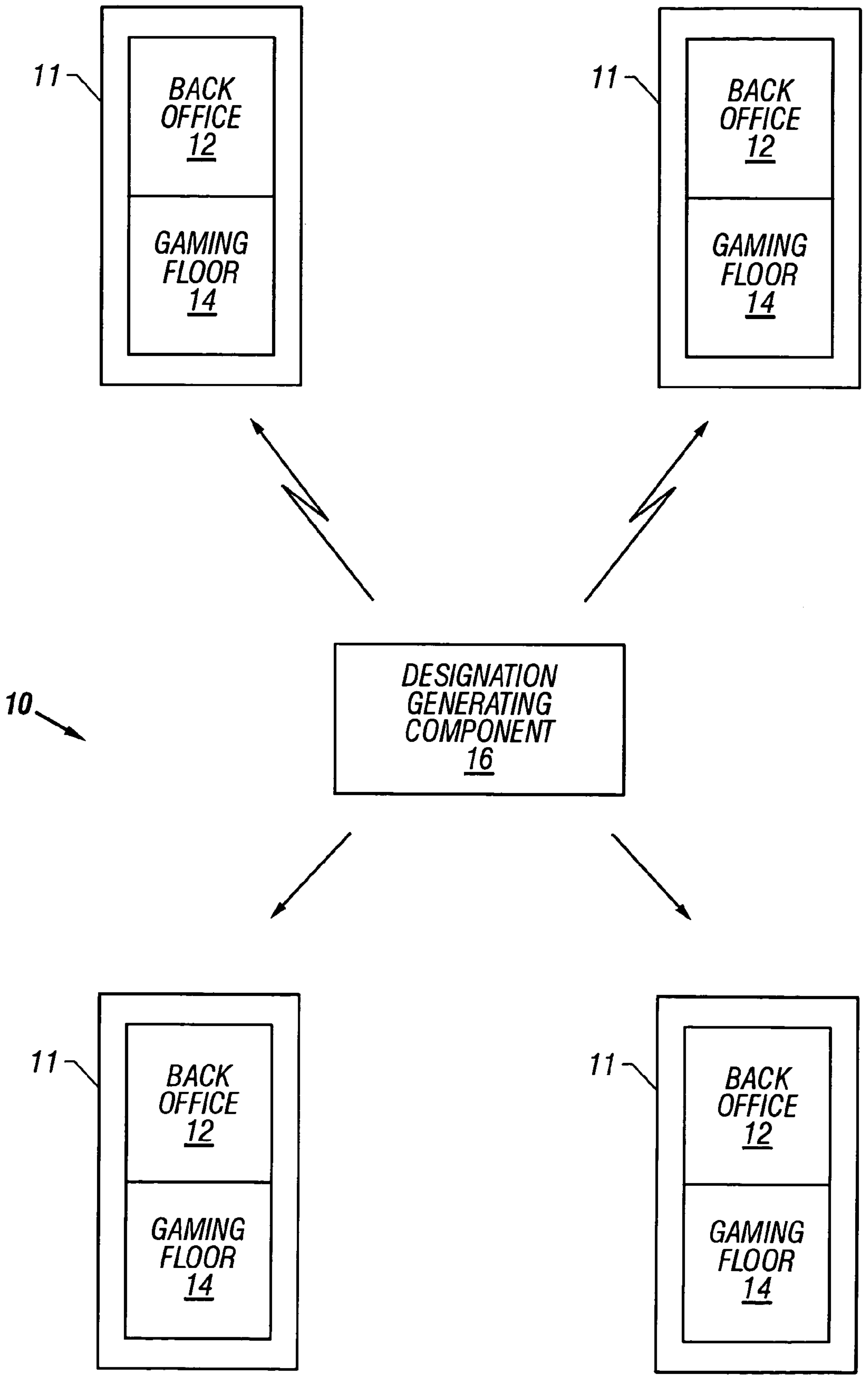
FIG. 1 is a diagrammatic representation of a gaming system embodying the principles of the invention.

Referring to FIG. 1, a gaming system 10 that may be used to describe the present invention includes at least one and preferably many gaming establishment components 11, each having a back office system 12 and a gaming floor or casino floor system 14. Gaming system 10 also includes a designation generating component 16 in communication with each gaming establishment component 11. Gaming floor system 14 is accessible to the public and allows players to establish and modify accounts in gaming system 10. Players also use gaming floor system 14 to participate in various games available through gaming system 10. Back office system 12 maintains accounts and account balances for players, maintains account information, and provides system usage reports and other reports useful in managing gaming activities at the particular gaming establishment component 11. Each back office system 12 also preferably matches electronic bingo cards (bingo card representations) to sets of game designations, stores the matched card sets, and assigns the game play records from the matched card sets in response to player requests made through the respective gaming floor system 14.

For each game played according to the invention, designation generating component 16 produces a series or set of game designations, hereinafter referred to as a game designation set, and communicates the game designation set to the various gaming establishment components 11. In one preferred form of the invention, designation generating component 16 includes an automated ball draw system which automatically draws a desired number of balls or other objects from a group of such objects. Each object is associated with a designation so that the series of objects drawn by the device identifies or defines a game designation set. Alternatively to the object draw device, designation generating component 16 may comprise any suitable arrangement for generating designations at random from a pool of available designations to produce the desired game designation set. Regardless of how the game designation set is produced, the resulting designation set is communicated to the gaming establishment components 11. A secure communications arrangement is used to provide communications from designation generating component 16 to the various gaming establishment components 11.

Numerous variations are possible for implementing bingo gaming systems employing player daub mode selection according to the present invention, even within the pre-matching type bingo gaming system shown in FIG. 1. For example, designation set generating component 16 may not be shared between multiple gaming establishments. Rather, each gaming establishment 11 may include a separate designation set generating component. Alternatively, a designation set generating component may be associated with one gaming establishment and provide designation sets for that establishment and others.

Figure 2:
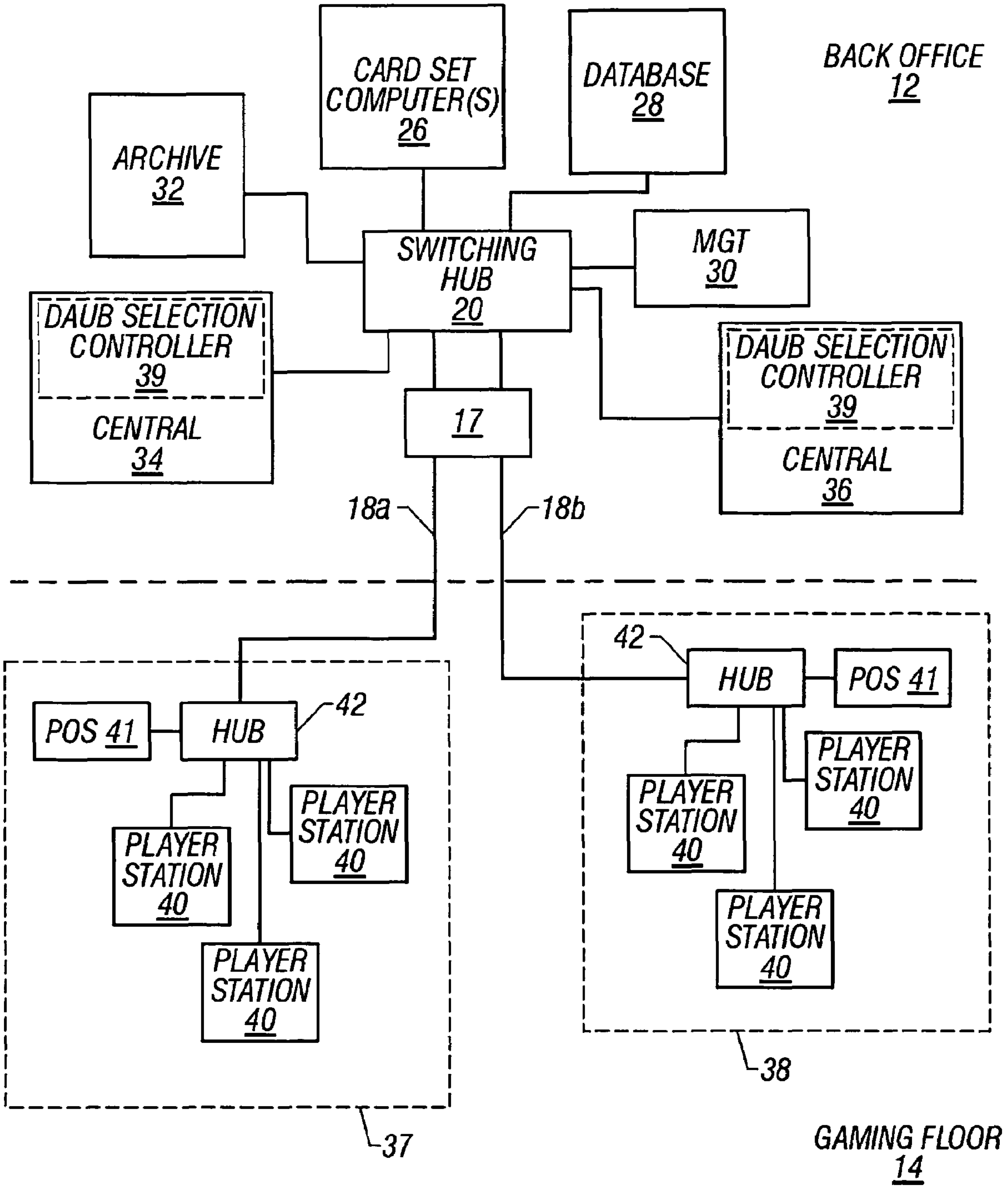
FIG. 2 is a diagrammatic representation of a gaming establishment component according to one form of the present invention.

FIG. 2 shows further detail of a single gaming establishment component 11. As shown in FIG. 2, a secure communications arrangement facilitates communications between back office system 12 and gaming floor system 14. Security may be enhanced with hardware firewalls 17 connected in the communications lines 18*a* and 18*b* that extend to gaming floor system 14 and/or by firewall software operating on the various computers that make up back office system 12.

Back office system 12 includes a number of separate processing devices interconnected through a suitable communications arrangement. In the illustrated form of the invention, back office system 12 comprises a local area network of individual processing devices and includes a switching hub 20 to which each separate processing device connects. The two floor system communication links 18*a* and 18*b* also connect into switching hub 20. Many other types of computer network communication arrangements may be used within the scope of the invention.

The illustrated preferred form of back office system 12 shown in FIG. 2 includes one or more card set computers 26, a database computer 28, a management computer 30, an archive computer 32, and two separate central computers 34 and 36. Card set computer 26, which may also be referred to as a card processing system, matches bingo card representations to game designation sets for different bingo-type games. In the preferred system, card set computer 26 not only matches or daubs card representations but also produces and stores one or more matched card sets, each matched card set including a number of game play records. As will be discussed further below, card set computer 26 preferably implements or represents a game daubing component for the present player selected daub mode invention for this particular type of gaming system. Each game play record corresponds to an individual bingo card representation in a set of bingo card representations used in creating the matched card sets. The matched card sets, or rather, data representing the matched card sets, are stored in a suitable storage device associated with card set computer 26 until a new or unused set is requested by one of the central computers 34 or 36. At that time, at least one of the matched card sets is communicated to the requesting central computer. Card set computer 26 may also be used to manufacture the set of bingo card representations to be used in the system. Alternatively, a set or perm of bingo card representations may be generated elsewhere and stored in card set computer 26 to be used in producing the desired matched card sets. It will be noted that the invention requires only a single set of bingo card representations to be used in creating numerous matched card sets; however, different sets of bingo card representations may be used to create matched card sets within the scope of the present invention. The structure of the individual bingo card representations will be discussed further below with reference to FIG. 4.

Each central computer 34 and 36 is programmed to communicate with card set computer 26, database computer 28, and with a particular group of gaming floor devices. FIG. 2 shows two separate groups of gaming floor devices, group 37 and group 38, for purposes of example. Central computer 34 is programmed to communicate with each of the gaming floor devices in group 37, while central computer 36 is programmed to communicate with each of the gaming floor devices in group 38.

Each central computer 34 and 36 stores data representing one or more matched card sets provided from card set computer 26 for use in servicing game play requests from the gaming floor devices as described below. Each central computer 34 and 36 also receives information from the various gaming floor devices in the respective group. Some of this information is stored in database computer 28. For example, central computer 34 receives requests from devices in group 37 to open a player account, add funds to a player account, and withdraw funds from a player account. Central computer 34 also receives game play requests from devices in group 37 and sends game play record information to the respective device in the group from which the respective game play request was received. As indicated in FIG. 2, each central computer 34 and 36 may be used to implement a respective daub selection controller 39. The function of this daub selection controller 39 will be discussed in detail below.

Database computer 28, along with its associated data storage device or devices, serves as a data storage repository for storing all player records and system usage information. Most importantly, database computer 28 stores in its associated data storage a player account table having entries corresponding to the various player accounts. The player account information includes, for example, the player's name, the player's account identifier or number, in some cases a personal identification number (PIN) for the player, and perhaps other player information personal to the particular player. As will be described further below, the player account information storage arrangement provides a convenient location for storing a player's daub mode selection so that the player need only make the selection once and then be effective for multiple gaming sessions. Database computer 28 may also collect and store usage information indicating the gaming floor devices players have used, and the extent of use.

Numerous different database structures for use in database computer 28 will be apparent to those of ordinary skill in database development and application. The invention encompasses any suitable database structure for maintaining the player and other information required in the operation of the gaming system 10.

Management computer 30 operates under the control of management software to provide system reports including real-time reports and system usage and performance reports of interest to the system operators, managers, or regulators. The software executed at management computer 30 also may be used to schedule administrative functions required or helpful for the database computer system 28. Management computer 30 may include a suitable display for providing a user interface and for displaying reports and other information. Although not shown in FIG. 2, a printer may also be included in the back office portion of the network or may be connected directly to management computer 30 for printing system reports and usage records.

In the preferred form of the invention, central computers 34 and 36 send used matched card sets back to card set computer 26. Card set computer 26 then periodically sends the used matched card sets to archive computer 32 which serves as a repository for used matched card sets. Archive computer 32 is also preferably used to store a copy of each complete unused matched card set as well. These unused matched card set copies and used matched card sets may be archived or stored in any suitable fashion in a nonvolatile memory or storage device associated with archive computer 32.

Referring now to the gaming floor devices shown in FIG. 2, each group 37 and 38 includes a number of player stations 40 and a point-of-sale or cashier terminal (POS) 41, all connected to a local area network communications hub 42. Although not shown in FIG. 2, each group may also include one or more remote point-of-sale (RPOS) terminals, and one or more kiosks also connected to the communications hub 42. The communications hub 42 of each gaming floor group is connected to switching hub 20 of the back office system 12 through one of the communications lines 18*a* or 18*b*.

Figure 3:
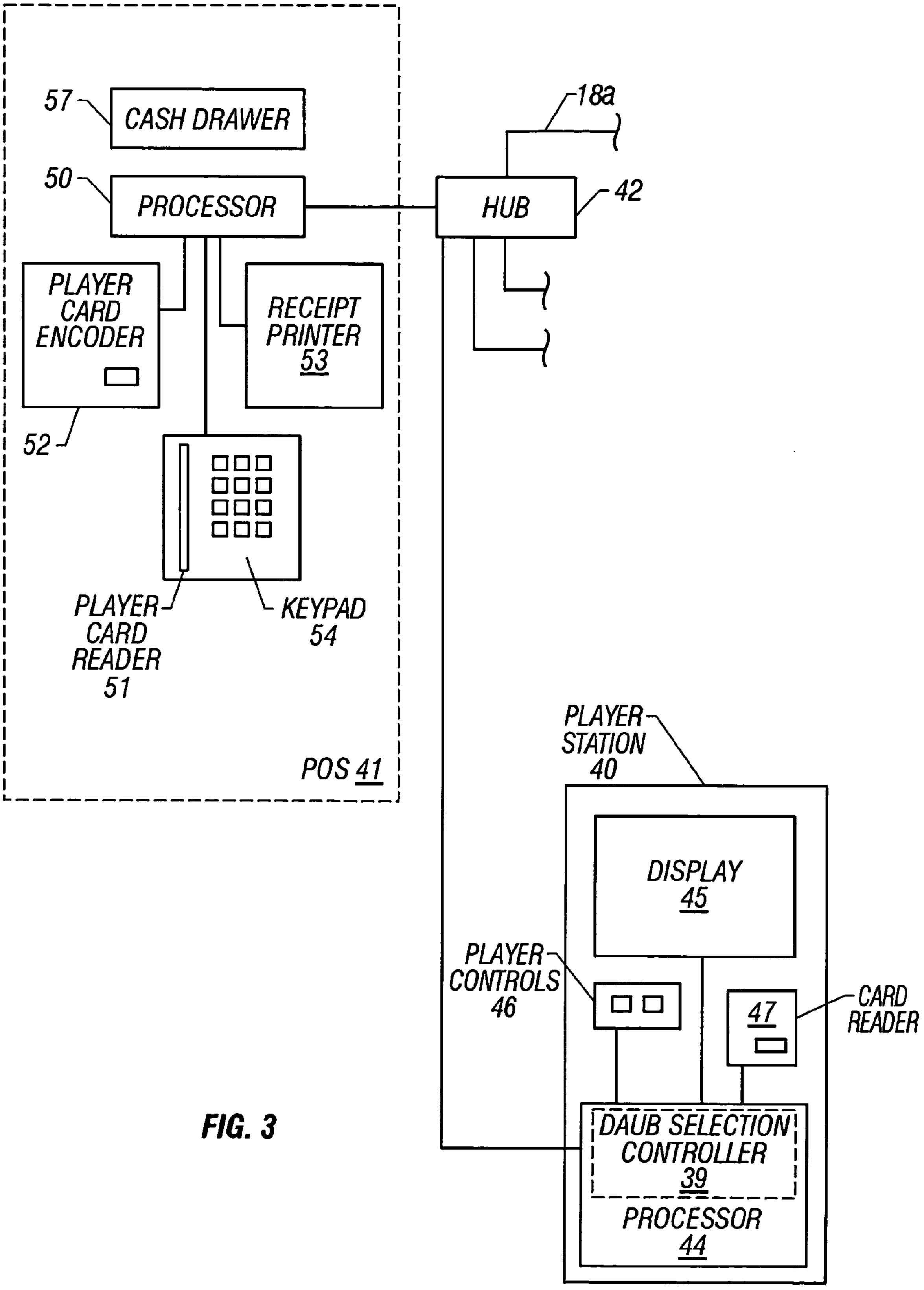
FIG. 3 is a diagrammatic representation of the point-of-sale terminal and player station shown generally in FIG. 2.

As shown in FIG. 3, each player station 40 includes a computer system having a processor 44, which may be used to implement a daub selection controller 39 according to the present invention, a touch screen display 45 or other display capable of displaying different graphical representations under control of processor 44, a control panel 46, and a player card reader 47. Touch screen display 45 and/or one or more controls, switches, levers, buttons, or other actuators in control panel 46 may be used to implement a daub selection control as will be described further below. Player station software executed by processor 44 receives information from player card reader 47 to log a player into the respective central computer (34 or 36), and then allow the player to participate in the games available through the player station by purchasing pre-matched bingo card representations and corresponding game play records. The player station software also causes display 45 to show a player the results of play as dictated by the purchased bingo card representation/game play record. Further information on the operation of the player stations will be described below with reference to FIG. 7.

It will be appreciated that the player stations may include other hardware depending upon the particular implementation of the gaming system. For example, it may be desirable for a player to add money to his or her account at the player station or simply add money for a wager at the player station. In these instances, player station 40 may also include a token, coin, or bill accepting device not shown in the present drawings, or some other device for accepting some form of payment at the player station. Although the illustrated "cashless" gaming arrangement comprises a preferred implementation for the gaming establishment components 11 shown in FIG. 1, it will be appreciated that the gaming system 10 is not limited to this preferred "cashless" gaming system or to any other system for interacting with the game players.

The example POS terminal 41 shown in FIG. 3 enables a player to open an account with the gaming system 10, add funds to his or her account, and close or cash out his or her account. In alternative forms of the invention, POS terminal 41 may allow a player to actually initiate a game play request and receive results in the form of a printed ticket, or may include an actuator or other user interface device to allow a player to make a daub mode selection input within the scope of the invention as described below. POS terminal 41 comprises a computer system having a processor 50 and a player/cashier interface including a player card reader 51, player card printer/encoder 52, a receipt printer 53, and keypad 54. POS terminal 41 also includes a cash drawer 57 which is accessible by a POS cashier or attendant. Processor 50 included in POS terminal 41 executes operational software to perform the steps described below with reference to FIG. 6.

Figure 4:
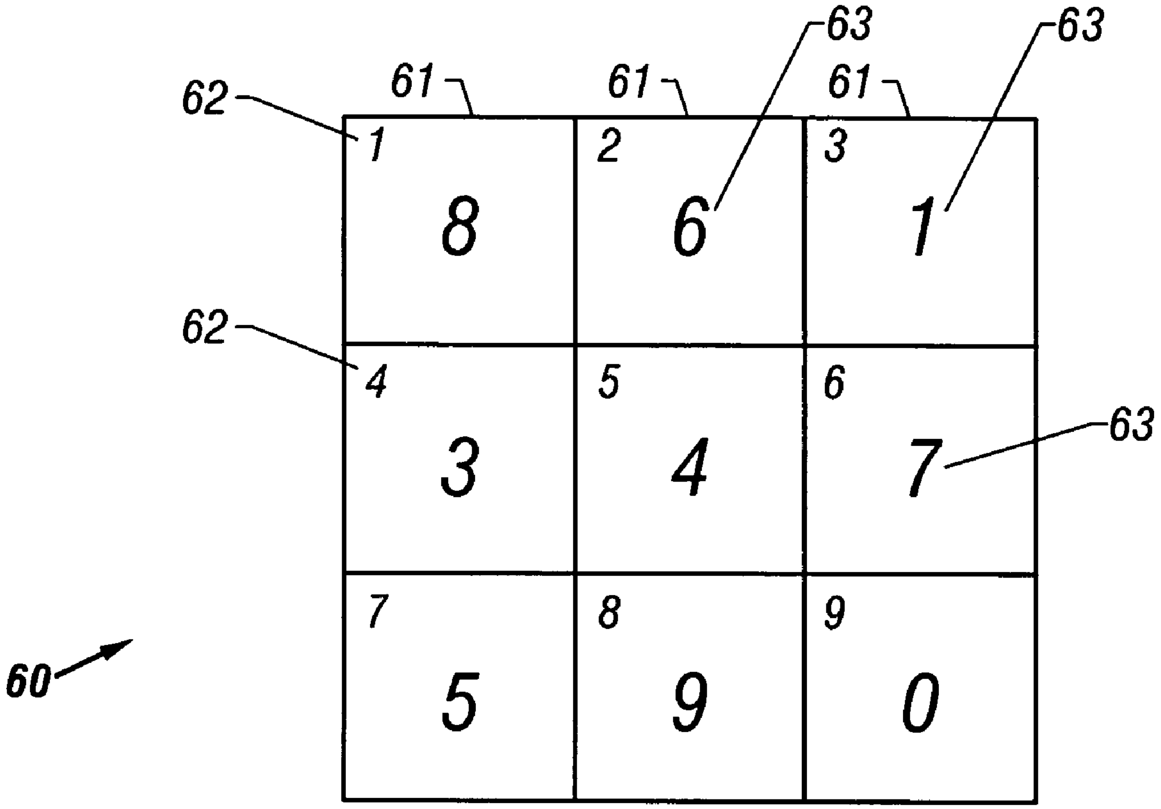
FIG. 4 is a representation of a game card used in the present invention.

Referring now to FIG. 4, each electronic game card or bingo card representation comprises a data structure that defines a grid 60 or other arrangement of designations 63. The illustrated grid 60 may be referred to as a nine-spot grid or card having nine separate locations 61 arranged in a three-by-three pattern. It will be appreciated that the card shown in FIG. 4 is shown only for purposes of example and that the invention is not limited to such a game card or card representation. Five-by-five bingo card representations or any other suitable representations may be used in lieu of the illustrated three-by-three card. For purposes of example only, the separate locations 61 on the illustrated three-by-three card are numbered one through nine by the location identifying numbers 62 appearing in the upper left hand corner of each location. Each game card has a random arrangement of card designations 63 positioned at the various locations 61 of the game card. In the illustrated example, card designations 63 comprise Arabic numerals. The designation residing at location 1 comprises the numeral 8 while the designation residing at game card location 2 is the numeral 6, and so forth as indicated in the illustration. The designations associated with the various locations 61 of the game card are selected from a pool of available designations.

Although the physical three-by-three grid is shown for purposes of illustrating a bingo card representation according to the present gaming system 10, it will be appreciated that the bingo card is actually represented in electronic form for use in the system. The data required to define a given bingo card representation may be arranged in any suitable fashion. For example, the game card may be represented by a series of the nine numerals with the first numeral in the series representing the designation at location 1, the second numeral in the series representing the designation at location 2 and so forth. In this format, the electronic representation for the bingo card shown in FIG. 4 will be a representation comprising series of numbers 8, 6, 1, 3, 4, 7, 5, 9, and 0. Each bingo card representation will also preferably include or be associated with a card identifier or serial number that distinguishes the particular bingo card representation from each other bingo card representation in the set.

It will also be appreciated that the invention is not limited to the illustrated designations comprising Arabic numerals. Any type of designation may be used according to the invention. However, the Arabic numeral designations are preferred because they may be conveniently represented in a digital format for processing with the various data processing devices that implement gaming system 10.

In gaming system 10, players effectively purchase bingo card representations by initiating game play requests through the various player stations 40, and perhaps through POS terminals 41 in some alternative arrangements. Each valid game play request in the illustrated bingo-type gaming system 10 causes a game play record corresponding to a pre-matched bingo card representation to be assigned to the player initiating the game play request. The result associated with that game play record is determined by the pattern in which the game designation set for the particular game matched the card designations associated with the corresponding bingo card representation.

Operation of the Gaming System

Figure 5:
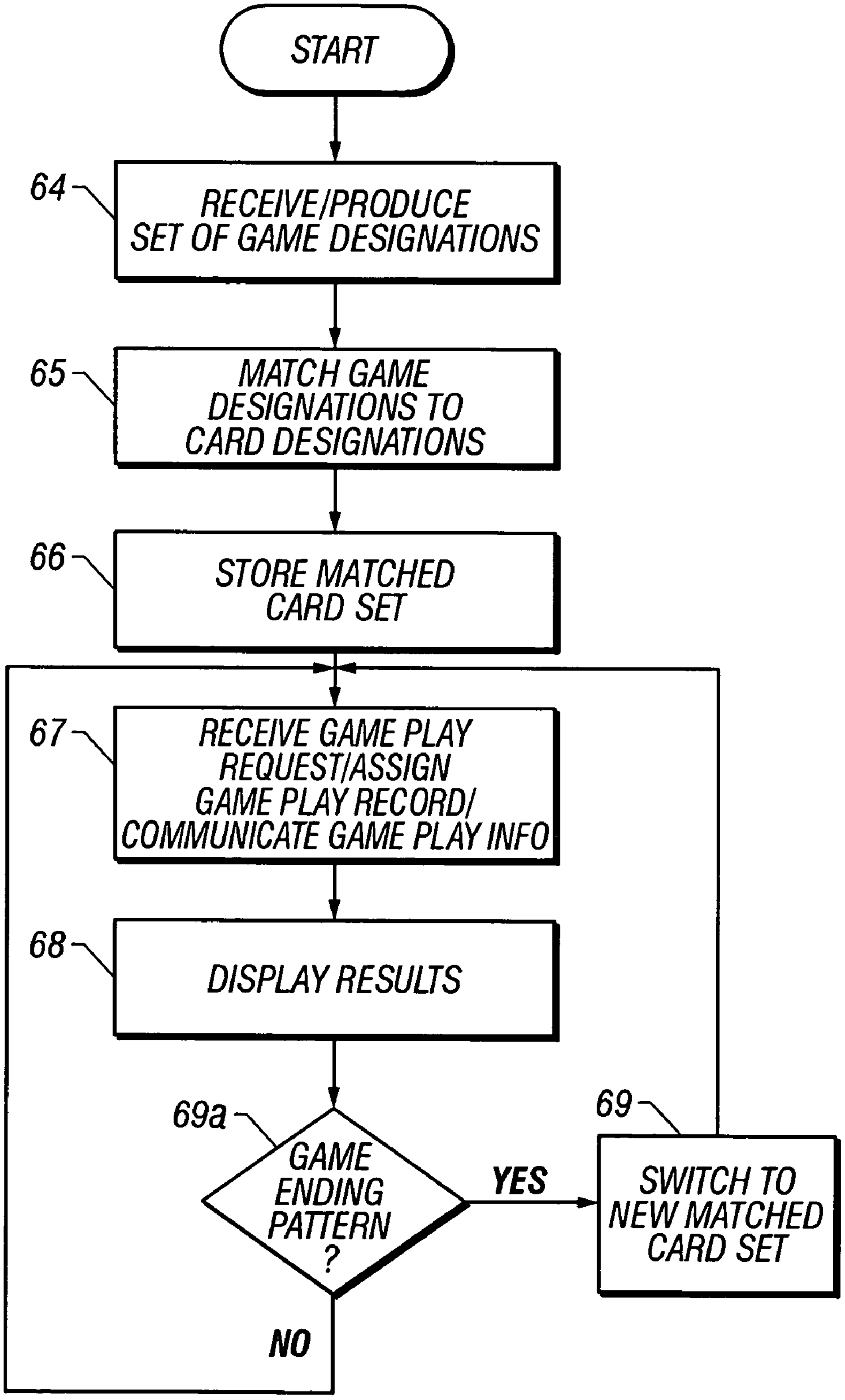
FIG. 5 is a flow chart showing the process steps associated with the overall play of a game according to the gaming system.

Referring to FIG. 5, a gaming method that may be used to describe the present invention includes at process block 64 receiving or producing a game designation set at a gaming establishment component 11 (FIG. 1). The preferred form of the invention then includes matching the game designation set with card designations of the respective bingo card representations as shown at process block 65. This step produces a matched card set which includes a number of game play records. Each game play record corresponds to a different one of the bingo card representations and is associated with a result in the bingo-type game. Each play record may include at least a card identifier for the respective bingo card representation, and a result indicator which indicates the result of the game play record, that is, the result of the match between the game designation set and the card designations. The game play record may also include data defining the actual bingo card representation. Details and variations in the game play records are omitted from the present disclosure so as not to obscure the present invention in unnecessary detail.

As shown at process block 66 in FIG. 5, the method further includes storing the data representing the matched card set in a suitable data storage device. In the implementation shown in FIGS. 1 and 2, the steps of receiving/producing the game designation set, matching the card designations to produce the matched card set, and storing the data representing the matched card set are all performed by operational program code executed at card set computer 26. In particular, matching program code performs the matching step and game set storage program code performs the storage step. Where card set computer 26 functions as the designation generating device, it also executes a suitable designation generation program which may invoke a random number generating function to generate the desired game designation set. Otherwise, card set computer 26 simply includes some communications arrangement for receiving the game designation set from the remote designation generating device (16 in FIG. 1).

In the illustrated form of the invention, the process of receiving a game designation set and producing matched card sets is repeated a number of times at a start of a gaming session to produce a number of matched card sets. The number of matched card sets may be necessary to ensure that the gaming system does not run out of game play records in the course of a gaming session. Also, several different bingo-type games may be in play at any given time in the preferred gaming system, and a different matched card set may be required for each different game in play. In fact, each matched card set represents an individual bingo-type game. In one preferred implementation, a player may have a choice of wager level, one credit, two credits, or three credits for example, where each credit is equivalent to some monetary amount. In this case, the different wager levels actually enter the player (that is, represent a game play request) in a different bingo-type game/matched card set. Thus, at least one matched card set must be available for each wager level available in the gaming system 10.

It will be appreciated that matched card sets may be generated very quickly with current data processing devices and techniques. It may therefore not be necessary to produce and store many different matched card sets for play in the present gaming system. Rather, a matched card set may be produced only as necessary in order to service or respond to play requests initiated by players in the gaming system. In this alternate form of the present invention, the central computer 34 or 36 may simply await a game play request by a player, determine if a matched card set is currently available or in play, and if not, generate a new matched card set. The game play request is serviced (a card representation is assigned) from the matched card set that is in play, or if a new matched card set is created, from the new matched card set.

The matched card set storage step 66 in FIG. 5 is performed initially at card set computer 26. However, the preferred form of the invention utilizing central computers 34 and 36 in FIG. 2 also stores matched card sets in storage associated with the central computers. As discussed further below, the game play records are preferably assigned to players directly from the central computers 34 or 36 rather than from card set computer 26.

Referring now to process block 67 in FIG. 5, a bingo-type gaming method in which the present invention may be implemented also includes assigning game play records from an appropriate matched card set in response to a game play request initiated by a player either at a player station 40 (FIG. 2) or perhaps at a POS terminal 41. In the preferred form of the invention, this assignment step is performed by game play assignment program code executed at the central computer (34 or 36 in FIG. 2) receiving the game play request. As will be discussed further below with reference to FIGS. 7 and 8, a central computer, 34 for example, monitors for the receipt of a game play request. If the request is valid, the respective central computer assigns a game play record from the appropriate matched card set to the requesting player as shown at process block 67 in FIG. 5. Sufficient data is then communicated back to the device through which the game play request was initiated to allow the player station to display the appropriate result representation and thereby give the player the results of the game play. This data includes a result indicator which may comprise as much as data sufficient to define the bingo card representation corresponding to the assigned game play record together with the matches made in the matching step 65, or as little as a code for indicating the result. Regardless of the manner in which the game play result is communicated to the player, the method includes the step of displaying the result representation correlated with the game play result to the player as shown at step 68.

If the assigned game play record corresponds to a bingo card representation that is not matched in a predetermined game ending pattern, as indicated at decision block 69*a* in FIG. 5, the process loops back to the point above the game play record assignment step (67) and the system waits for the next game play request. However, if the assigned game play record corresponds to a bingo card representation matched in the game ending pattern, the process includes switching to a new bingo-type game represented by a new matched card set as indicated at process block 69. After switching to the new matched card set, the method includes simply waiting for the next game play request. It will be noted that there may be unassigned matched card representations remaining in the matched card set after the game play record corresponding to the card representation having the game ending pattern has been assigned and is held by a player. Any of these unassigned matched card representations or game play records therefore are preferably disregarded by the system and are not used.

When a player opens an account in the preferred “cashless” gaming system 10, his or her account is associated with an account identifier or number. This assigned identifier is then used as an identification element to access the account later. The player also preferably receives a player card encoded with the particular identification element in a suitable machine readable fashion. The player may also be required to set a personal identification number (PIN) for his or her account which must be used in conjunction with the identification element in order to access the player’s account, at least for certain purposes. Player information including the player’s name, account identifier, and PIN are stored in back office system 12, and specifically in a player account table stored in a data storage device associated with database computer 28.

The player's account identifier is encoded on the player card so that account access may be initiated by swiping the card through an appropriate reader such as the player station card reader 47. Alternatively, account access may preferably be initiated by keying in the player account identifier through a suitable system interface. If the player has sufficient funds in his or her account with gaming system 10, he or she may purchase one or more game play records/pre-matched bingo card representations at the various player stations 40 (FIGS. 2 and 3) as will be described in detail below.

Figure 6:
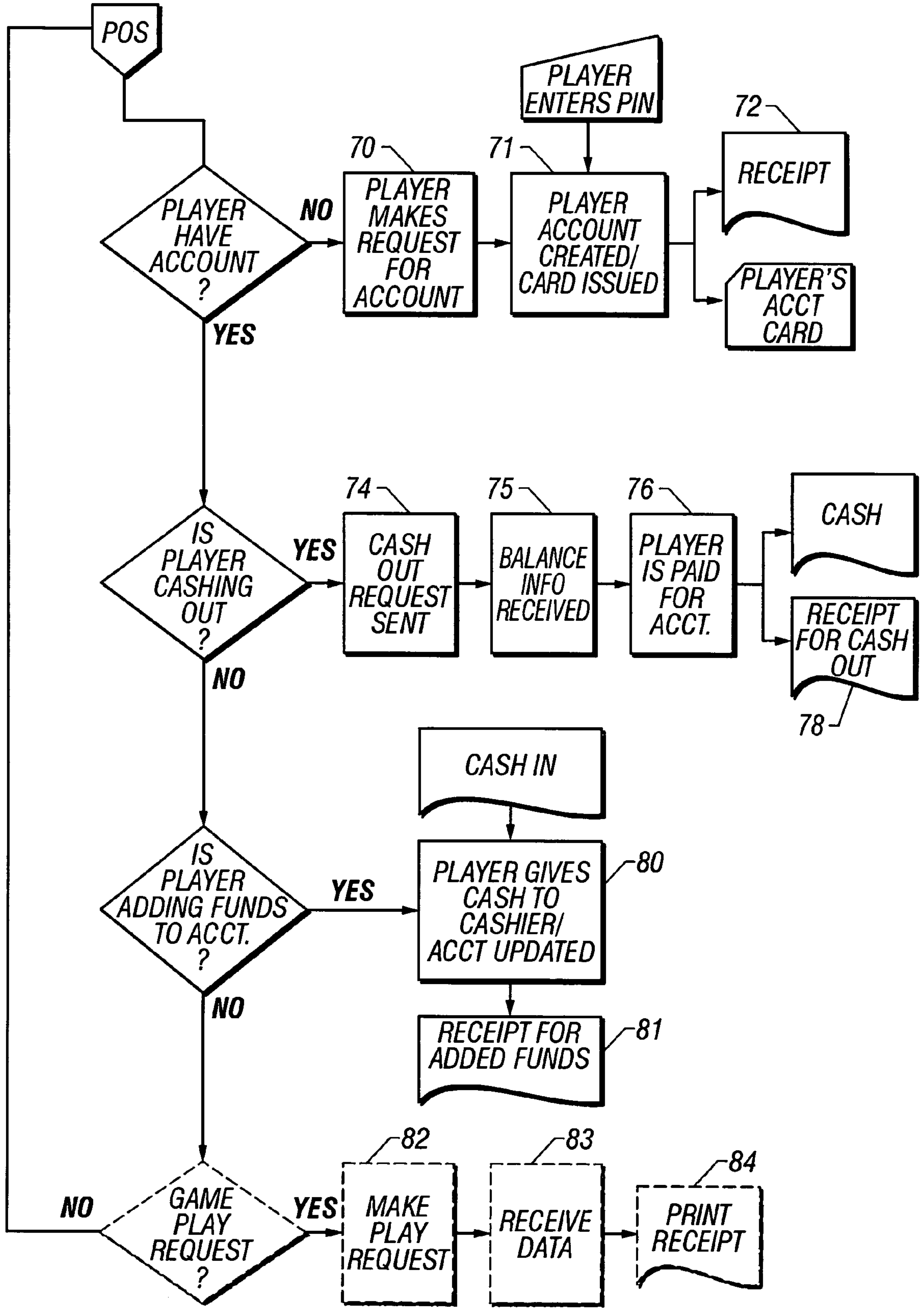
FIG. 6 is a flow chart showing process steps associated with the operation of the point-of-sale terminals.
Figure 7:
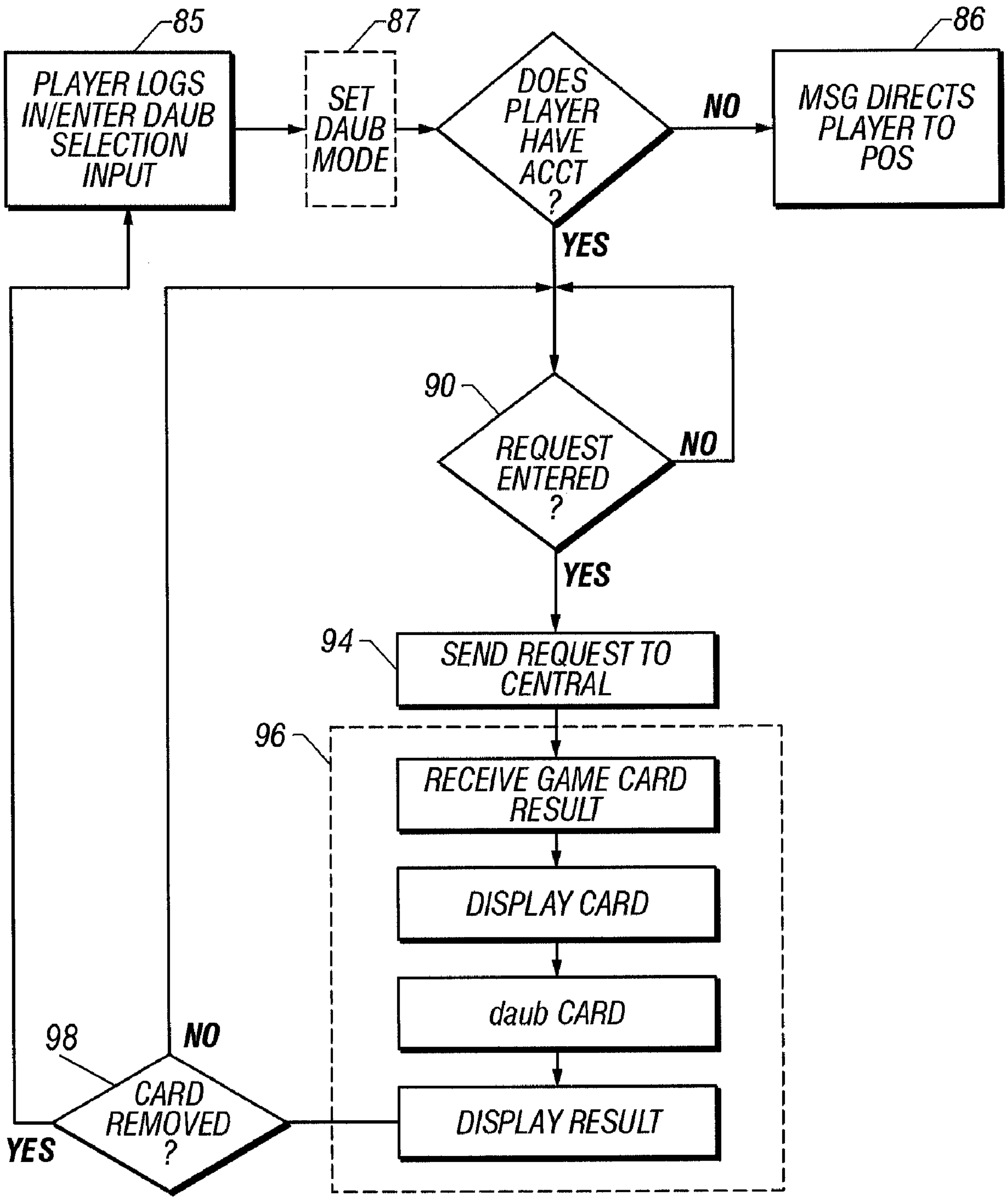
FIG. 7 is a flow chart showing process steps associated with the operation of the player stations.
Figure 8:
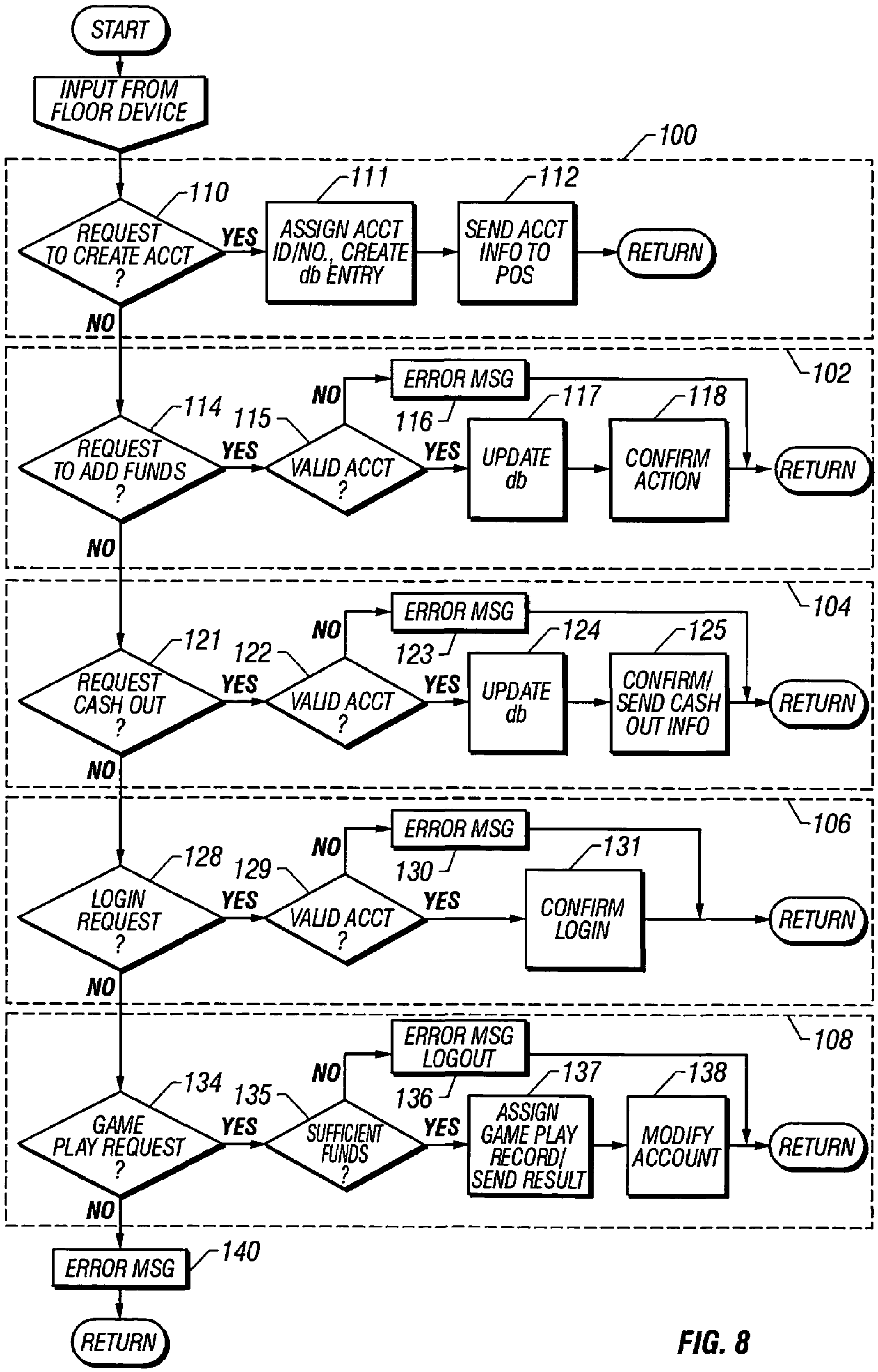
FIG. 8 is a flow chart showing process steps at the central computers.

FIGS. 6 and 7 illustrate the processes performed at the gaming floor devices shown in FIGS. 2 and 3, while FIG. 8 illustrates the processes performed at a central computer 34 or 36 shown in FIG. 2. In the example system 10 shown in FIG. 2, each of the gaming floor devices cooperate with a particular central computer, and thus it is necessary to refer to a particular central computer when describing the game floor device processes. For purposes of example, all of the processes described with reference to FIGS. 6 and 7 will refer specifically to central computer 34; however, it will be appreciated that the other central computers cooperate with their respective gaming floor devices in the same fashion. Similarly, FIG. 8 will be described with reference to central computer 34 in order to simplify the discussion, although the identical processes are performed by each central computer in the system. It will be appreciated that the hardware components mentioned in the following discussion of FIGS. 6-8 are references to components shown in FIGS. 1-3.

FIG. 6 illustrates the various processes performed at the POS terminals 41 shown in FIGS. 2 and 3. The primary functions performed through POS terminals 41 include opening a player account, closing or cashing out a player account, or adding funds to a player account. The process of opening an account includes at process block 70 sending an account request from the POS terminal 41 to the associated central computer 34. This account request may include a daub mode selection within the scope of the invention in some forms of the present invention. As will be discussed below with reference to FIG. 8, central computer 34 returns an account identifier which is then encoded onto a player's card at player card printer/encoder 52 (FIG. 3). The player's account card is then issued by the printer/encoder 52. The encoding and issuing step is shown at 71 in FIG. 6. The preferred system also prints an account opening receipt as shown at process block 72 using the POS terminal printer 53 (FIG. 3). The player can then use the player card to log in at a player station 40 as will be discussed further below with reference to FIG. 7. Where the player has made a daub mode selection in the account opening process, merely logging in to a player station 40 causes the gaming system 10 to provide the desired daub mode according to the invention.

If the player desires to close or cash out his or her account, POS terminal 41 communicates a cash out request to the respective central computer 34 (FIG. 2) as shown at process block 74. The respective central computer 34 responds with a message indicating the player's account balance. Upon receipt of this balance information at process block 75, the cashier at POS terminal 41 may pay a cash balance to the player as indicated at process block 76. POS terminal 41 may also use the data received from the central computer 34 to print a cash out receipt as shown at block 78 using POS terminal receipt printer 53 shown in FIG. 3.

If the player desires to add funds to his or her account at POS terminal 41, the POS terminal communicates the player's account identifier and the amount to be added to central computer 34 as indicated at process block 80. The receiving central computer then updates the player's account information stored at database computer 28 (FIG. 2). As shown at block 81, POS terminal printer 53 may print a receipt for the player indicating the amount added to the account and perhaps the account balance after the addition. The process of adding funds to an account as indicated in FIG. 6 may be thought of as an account modification. Another account modification that can occur is a modification of the player's desired daub mode. Such a daub mode modification may be selected or entered through a POS terminal 41 within the scope of the present invention.

In some preferred implementations employing the present invention, players may initiate game play requests through POS terminals 41 with the aid of the POS terminal attendant or cashier. This optional process is shown at the dashed process blocks at the bottom of FIG. 6. A player initiates a game play request at POS terminal 41 by providing account information to the POS terminal attendant/cashier or entering the information directly as shown at process block 82. With the aid of the attendant/cashier, the player ultimately makes an entry indicating his or her desire for a play in one of the games available through gaming system 10. POS terminal 41 then communicates a game play request to the central computer 34. The complete process performed at central computer 34 in response to the game play request will be described with reference to FIG. 8. The end result of the process for a valid game play request is that the central computer assigns a game play record to the requesting player and communicates information regarding the game play record back to the device from which the game play request was initiated. The receipt of this game play record information is shown at process block 83 in FIG. 6. POS terminal 41 uses this game play record information to print a game play receipt at process block 84 using the POS terminal printer 53 or some other printer associated with the POS terminal. The receipt may include a daubed reproduction of the bingo card representation corresponding to the game play record which was assigned to the player.

Referring now to FIG. 7, the preferred process at a player station 40 (FIG. 2) requires a player to log in to the gaming system 10 as shown at block 85 prior to initiating a game play request at the station. In the preferred login process, the player inserts his or her player card into the player station card reader 47 (FIG. 2). This causes a communication to the central computer 34 which prompts the central computer to look up the player's account and then return an indicator indicating whether the account is valid or not. If the account is not valid, player station 40 displays a message directing the player to a POS terminal 41 to open an account as shown at process block 86. However, if the player does have a valid account, player station 40 may produce a message indicating that the system 10 is ready for play, and waits for the logged in player to request a play in a game or take some other action. As indicated at decision block 90, if the player requests a play in a game, player station 40 communicates data representing a game play request to the respective central computer at block 94. The game play request data may include a wager amount indicator where different wagers are possible. In the preferred form of the invention different matched card sets are used to service game play requests at different wager levels. Thus, when a player designates a wager level at player station 40, that wager level may designate a particular matched card set or type of matched card set stored at the central computer 34. In any event, player station 40 ultimately receives the results associated with the particular game play record assigned to the respective game play request by the central computer 34, and eventually displays those results as shown at process block 96. If the player's account card is then removed as indicated at decision block 98, the player is logged out of the system and the player station may go to an attract mode. Otherwise, player station 40 simply waits for the player to request another game play.

According to the present invention, the player may use a control in panel 46 of the player station 40 and/or the touch screen display 45 to enter or make their daub mode selection input. The control in panel 46 or the particular location on the touch screen display 45 represents a daub selection control that the player activates to initiate a signal that ultimately results in a daub select signal to the daub selection controller 39. It will be appreciated that specifically where daub selection controller 39 is implemented in the system will determine whether the input from the player station device 40 represents the daub select signal itself or some intermediate signal that results in a daub select input being created and directed to the daub selection controller. Preferred forms of the invention may give the player the opportunity to make their daub mode selection input as part of the login process indicated at 85 in FIG. 7 or at least prior to entering any game play request. As indicated above, where a player's desired daub mode may be associated with the player's account, no separate daub mode selection input at player station 40 may be required to select a daub mode according to the present invention. However, even where the player's account is associated with a daub mode selection, the player is preferably given an opportunity to change their daub mode selection either at login or between game play requests.

Regardless of whether the player's game play request input has been made prior to logging in at a player station 40 or is made at the player station itself, a daub selection controller 39 responds to the daub mode selection input by setting a daub mode as indicated at block 87 in FIG. 7. This block 87 is shown in dashed lines because it assumes the alternative where the daub selection controller 39 is implemented at player station 40. The types of daub modes will be described below along with the particular player interaction under the various modes, however, it should be mentioned here that setting a daub mode has the effect of defining how player station 40 interacts with the player to ultimately reveal the results of a game play to the player. Daub selection controller 39 is responsible for providing the appropriate instructions to allow player station 40 to interact appropriately with the player to effect the selected daub mode. A preferred daub selection controller 39 is implemented in daub selection control program code executed at player station processor 44. In one preferred form of the invention daub selection controller 39 maintains a series of configuration instructions or a series of configuration instruction sets, each associated with a particular daub mode available in the system. Daub mode controller 39 sets a daub mode in response to the player's daub mode selection input by communicating the particular configuration instruction or instruction set within the respective player station 40 (or to the respective player station) to cause the player station to configure itself to interact with the player according to the player's selected daub mode.

The manner in which a player requests a game play is dependent upon the particular type of player interface at the player station 40. Player controls 46 may be included in the display in the form of a touch screen display such as display 45 in FIG. 3. Alternatively or in addition to a touch screen display 45, various buttons or other user interface devices may be included at the player stations as indicated by controls 46 in FIG. 3. Regardless of the particular player interface, the player operates the player controls 46 to request a game play, and thereby initiate a game play request communication from the player station 40 to the central computer servicing the player station. The data included in the game play request communication must at least include sufficient data to allow the respective central computer to identify the matched game set from which the game play request is to be serviced. For example, the data included in a game play request may include a game type identifier which identifies a particular type of matched card set at the central computer 34. The central computer may then use this game type identifier to choose the appropriate matched card set from which to assign a game play record.

The steps involved in receiving and displaying the results associated with a game play record as indicated at process block 96 may vary significantly within the scope of the invention. For example, player station 40 may actually receive the information defining the grid (60 in FIG. 3) and display the grid of designations making up the purchased game card. Information to define the grid of designations may be required at player station 40 depending upon the daub mode selected by the player. The information defining the grid of designations comprising the game card may comprise a data structure defining the respective designation at the respective locations on the grid or may comprise simply a serial number that player station 40 may use to look up such a data structure in a database of such structures. This bingo card database may be stored at the player station 40 or elsewhere in the gaming system.

Preferred forms of the present invention allow the player to select between at least one first-type daub mode and at least one second-type daub mode. One first-type daub mode comprises a manual daub mode in which the player must manually daub one or more card locations in order for the player to see the result of the play. Another first-type daub mode comprises a card daub mode in which multiple matched card locations are daubed automatically in response to a player daub input through a suitable interface or control 45 or 46 at player station 40. These first-type daub modes each require an independent player input in order to see the results of a play in the game. That is, the manual daub mode requires the player's independent input of each matched location on the card representation, and the card daub mode requires the player's independent input of a daub input to cause the player card representation to be daubed. These are considered independent inputs because they are inputs in addition to the daub mode selection input required to select the daub mode.

In contrast to the first-type daub modes in which an independent input is required from the player to see the result of play, a second-type daub mode requires no such independent input. A game daub mode is a second-type daub mode in which the matched locations on a player card are daubed exclusively by a game daubing component in the gaming system such as card set computer 26 shown in FIG. 2. In this game daub mode the player relies entirely on the matching of designations performed by the gaming system itself without player intervention. The particular component of the gaming system that represents the game daubing component may vary from one implementation to the next. For example, although a centralized gaming component, card set computer 26, is given as an example of the game daubing component, the game daubing component need not be centralized and the player station 40 itself may implement the game daubing component in some forms of the present invention. It is required only that the game daubing component be capable of daubing or matching the player's card without player intervention to identify the result of the play. Regardless of where the game daubing component resides in the gaming system, the request for a play entered by the player at player station 40 in this game daub mode of play represents a request for automatic daubing. Since no daubing player input is required at player station 40, the data communicated from the central computer 34 to the player station 40 need only include a result indicator containing information on whether the corresponding bingo card representation produced a winning or losing pattern when matched with the respective game designation set. However, it may be desirable to still send to player station 40 information necessary to allow the station to produce a graphical representation of the respective matched bingo card. This is true as to the game daub mode as well as the card daub mode. Of course, the manual daub mode requires that a representation of the player card be produced at the player station 40 to enable the player to make their daub inputs for the individual card locations.

Whether the actual card representation for a play in the bingo-type game is included in the result representation displayed at the player station or is not included in the result representation, the result of the game play, that is, the result associated with the game play record/bingo card representation assigned to the player, may be displayed in any number of fashions unrelated to the bingo-type game. For example, the results may be displayed as spinning reels imitating a slot machine. The spinning reels would stop at a point indicating a win or loss according to the result dictated by the purchased game play record and according to some predefined meaning of reel indicia combinations. That is, the result indicated by the reel indicia showing after the reels have stopped spinning is correlated to the result of the bingo-type game. In this reel-type game or slot machine example, the display of spinning reels at the player station comprises a graphical representation totally dissimilar to the pattern of locations daubed on the underlying bingo card representation.

As other examples, the game play result could be displayed as a horse or dog race having a particular result, or as a result in some other type of casino game such as poker, craps, or roulette, or in any other desired fashion providing a graphical representation unrelated to the game of bingo or dissimilar to the bingo pattern which is associated with the bingo game result. Further alternative result display techniques within the scope of the invention may retain aspects of a traditional bingo game and combine those aspects with other games in some way.

As shown in FIG. 8, central computer 34 is involved in servicing a game play request as well as creating, modifying, and cashing out a player's account. Since a game play request uses a wager to purchase a bingo card representation/game play result, a game play request can in fact be thought of as a particular type of request to modify the player's account. The central computer steps associated with creating an account are shown at dashed box 100 in FIG. 8, while the steps associated with adding finds to an account and cashing out an account are shown in FIG. 8 at dashed boxes 102 and 104, respectively. The central computer steps associated with logging a player in to a player station 40 or other floor device and with servicing a game play request are shown at dashed boxes 106 and 108, respectively in FIG. 8.

As shown at dashed box 100 in FIG. 8, if central computer 34 determines that the received communication is a request to create an account at decision block 110, the central computer cooperates with the database computer 28 to assign a unique account number to the player and to create a new entry for the player in the database controlled by database computer 28 (FIG. 2). This account number assignment and database entry step is shown at process block 111. The new database entry includes an account balance for the player. Information for the beginning account balance may have been communicated from the POS terminal 41 to the central computer along with the request to create a new account or may have been communicated in a separate step. Central computer 34 also communicates the new account information back to the respective POS terminal 41 from which the account creation request was received, as shown at process block 112. As discussed above with reference to FIG. 6, POS terminal 41 uses this information to create a new player card and create a receipt for the player. Where the account is associated with a PIN, central computer 34 also stores the PIN information in the database entry for the player/account and confirms the PIN with the POS terminal 41. Once the account creation steps are complete, the process returns to START to wait for the next input from a gaming floor device.

In some forms of the invention, the request to create an account communicated to the central computer 34 may include a daub mode selection input as described above. In this case the steps at block 111 may also include storing the selected daub mode or the player's daub mode selection input in the player's account. This information may then be used to set the daub mode when the player logs in at a player station 40.

If central computer 34 determines that a received communication is a request to add funds to an existing account at decision block 114, the process at the central computer branches to the steps shown in dashed box 102 in FIG. 8. The "add funds" steps include first checking to see if the account information associated with the request is a valid account as shown at decision block 115. If the account is not a valid account, central computer 34 returns an error message to the requesting POS terminal 41 as shown at 116 and may return to START. The determination indicated at decision block 115 may be made by querying database computer 28 (FIG. 2) to determine if the account identifier corresponds to an open or active account in the account/player database. If this account validation step indicates that the account is valid, central computer 34 updates the entry for the account to add the funds associated with the request as shown at process block 117. Central computer 34 also preferably confirms the execution of the "add funds" request by sending an appropriate confirmation back to the POS terminal 41 from which the request was received. This confirmation step is shown at process block 118. After confirmation, the process returns to START to wait for the next request from a gaming floor device.

Where the player's account may be associated with a daub mode selected by the player or the player's daub mode selection input, the request at 114 may include, or may alternatively be, a request to modify the player's daub mode selection. In that case, the update step shown at block 117 may include updating the player account information to reflect the player's new daub mode.

If central computer 34 determines that a received communication is a request to cash out an existing account at decision block 121, the process at the central computer branches to the steps shown in dashed box 104 in FIG. 8. Central computer 34 first determines if the account identified in the request is a valid account at decision block 122 similarly to step 115 described above. If the account is not valid, central computer 34 causes an error message to be communicated back to the requesting POS terminal 41 as shown at block 123 and then returns to START. If the account is determined to be a valid account, central computer 34 updates the database by reducing the balance for the account to zero. This account database update step is shown at process block 124 in FIG. 8. After or in conjunction with the database update step, central computer 34 sends cashout information back to the requesting POS terminal as shown at process block 125 to allow the terminal and the cashier at the terminal to take the appropriate action.

Referring now to dashed box 106 in FIG. 8, central computer 34 detects a login request from a player station 40 as shown at decision block 128. In response to the login request, central computer 34 determines if the account is valid as shown at decision block 129 and sends an error message back to the respective player station 40 if the account associated with the login request is invalid as shown at process block 130. If the account is a valid account, central computer 34 communicates confirmation or login information back to the player station 40 to activate the station to accept a game play. This confirmation/login step is shown at process block 131 in FIG. 8. Central computer 34 then waits for the next request from a gaming floor device.

As mentioned above with reference to FIG. 7, a login request or a request from the player station 40 after login may include a daub mode selection input. A daub mode selection input at this point may merely cause the daub selection controller 39 to set the daub mode for game play at the respective player station 40 without affecting any player account information. Alternatively, a player's daub mode selection input at a player station 40 may be interpreted as a request to change the player account information to reflect a new daub mode in addition to setting the daub mode at the respective player station 40.

The game play request servicing processes at the central computer 34 are shown generally at dashed box 108. Upon receipt of a game play request as indicated at decision block 134, central computer 34 determines if the player's account has sufficient funds to cover the wager associated with the game play request. This determination is shown at decision block 135 and may be made by querying database computer 28 to determine the player's account balance and comparing it to the wager indicated in the game play request. If the player has insufficient funds in his or her account, central computer 34 sends an insufficient funds message back to the respective player station 40 as shown at process block 136. However, if the player has sufficient funds in his or her account to cover the wager associated with the game play request, central computer 34 assigns to the requesting player the next available game play record in the appropriate matched card set as shown at block 137 in FIG. 8. This step may also include the step of communicating the result associated with the game play record to the respective player station. Central computer 34 then modifies the player's account data at database computer 28 by debiting the amount of the wager and adding the amount of any winnings associated with the game play record assigned to the player. This account modification step is shown at block 138 in FIG. 8.

It will be appreciated that a daub mode selection input or daub mode setting may be stored for a player separate from any player account for tracking player credits and other information. That is, the present invention encompasses an arrangement in which a daub mode selection input or daub mode setting for a player may be stored separately in the system aside from any player information or any player account information. This stored daub mode information may be used to control the daub mode for a player just as if the information was stored with player account information as described above.

The above described preferred embodiments are intended to illustrate the principles of the invention, but not to limit the scope of the invention. Various other embodiments and modifications to these preferred embodiments may be made by those skilled in the art without departing from the scope of the present invention. For example, although a particular hardware arrangement is shown for purposes of describing the invention, it will be appreciated that numerous hardware arrangements are possible for implementing the present invention. Also, although the operational software-controlled process steps are described as occurring at certain processing elements in the system, the processing steps may be distributed in any suitable fashion over various data processing elements.

The invention claimed is:

1. A gaming system for conducting bingo-type games, the gaming system including:

(a) a player station having a login device for enabling a player login input to log a player in to the player station;

(b) a device located remotely from the player station for storing a first daub mode for the player;

(c) a user interface device included with the player station for enabling the player to selectively enter a first daub mode selection input and a second daub mode selection input;

(d) a daub selection controller for (i) setting a daub mode for the player station as the first daub mode in response to the first daub mode selection input, for (ii) setting the daub mode for the player station as a second daub mode in response to the second daub mode selection input, and for (iii) setting the daub mode for the player station as the first daub mode in response to the player login input; and (e) a player station control included with the player station for enabling the player to make a game play request to enter a bingo card representation in a bingo game, the game play request comprising an input separate from the first daub mode selection input and the second daub mode selection input.

2. The gaming system of claim 1 wherein the user interface device is also for enabling the player using the player station to selectively enter a third daub mode selection input and wherein the daub selection controller is also for setting the daub mode for the player station as a third daub mode in response to the third daub mode selection input.

3. The gaming system of claim 1 wherein the daub selection controller is located at a component of the gaming system located remotely from the player station and wherein the player station causes a selection signal to be communicated to the daub selection controller in response to the first daub selection input and the second daub selection input.

4. The gaming system of claim 1 wherein the daub selection controller is located at the player station.

5. The gaming system of claim 1 wherein the device located remotely from the player station for storing the first daub mode for the player also stores player account information for the player.

* * * * *